United States Patent [19]

Chung et al.

[11] Patent Number: 4,745,148

[45] Date of Patent: * May 17, 1988

[54] THERMOPLASTIC POLYESTER MOLDING COMPOSITION HAVING AN IMPROVED IMPACT PERFORMANCE

[75] Inventors: James Y. J. Chung, New Martinsville, W. Va.; Peter H. Markusch, McMurray, Pa.; Mark W. Witman, Krefeld, Fed. Rep. of Germany

[73] Assignee: Mobay Corporation, Pittsburgh, Pa.

[*] Notice: The portion of the term of this patent subsequent to Jun. 11, 2002 has been disclaimed.

[21] Appl. No.: 854,207

[22] Filed: Apr. 21, 1986

Related U.S. Application Data

[63] Continuation of Ser. No. 600,047, Apr. 13, 1984, abandoned.

[51] Int. Cl.$^4$ .............................................. C08L 67/02
[52] U.S. Cl. ....................... 524/504; 525/64; 525/66; 525/124; 525/127
[58] Field of Search ................ 525/66, 64, 124, 131, 525/127; 524/504

[56] References Cited

U.S. PATENT DOCUMENTS

| | | | |
|---|---|---|---|
| 3,563,849 | 2/1971 | Rye | 525/440 |
| 3,769,260 | 10/1973 | Segal | 260/40 R |
| 3,864,428 | 2/1975 | Nakamura et al. | 260/873 |
| 3,947,426 | 3/1976 | Lander | 260/77.5 |
| 4,022,748 | 5/1977 | Schlichting | 525/64 |
| 4,022,752 | 5/1977 | Horn | 524/98 |
| 4,096,202 | 6/1978 | Farnham et al. | 260/873 |
| 4,178,277 | 12/1979 | Gehauer | 528/291 |
| 4,179,479 | 12/1979 | Carter | 525/66 |
| 4,180,494 | 12/1979 | Fromuth et al. | 260/40 R |
| 4,292,226 | 9/1981 | Wenzel | 524/839 |
| 4,522,979 | 6/1985 | Chung | 525/66 |

Primary Examiner—Patricia A. Short
Attorney, Agent, or Firm—Gene Harsh; Joseph C. Gil; Aron Preis

[57] ABSTRACT

A thermoplastic molding composition comprising a blend of a thermoplastic polyester, a rubber-elastic impact modifying compound and a certain blocked (capped) polyisocyanate prepolymer is disclosed characterized in that it has an improved level of impact strength.

10 Claims, No Drawings

THERMOPLASTIC POLYESTER MOLDING COMPOSITION HAVING AN IMPROVED IMPACT PERFORMANCE

This application is a continuation of application Ser. No. 600,047 filed Apr. 13, 1984, now abandoned.

FIELD OF THE INVENTION

The present invention relates to thermoplastic molding compositions and more particularly to impact modified thermoplastic polyesters.

SUMMARY OF THE INVENTION

Improved impact strength was found to characterize a thermoplastic molding composition comprising a blend of a thermoplastic polyester, a rubber-elastic compound and certain blocked (capped) polyisocyanate prepolymers.

BACKGROUND OF THE INVENTION

The relevant prior art is noted to include U.S. Pat. No. 4,096,202 wherein disclosed is a polyalkylene terephthalate resin containing a crosslinked acrylic-phase-based multiphase composite, the composition being characterized in its improved impact strength. U.S. Pat. No. 3,864,428 is noted to disclose impact strength improvement imparted to an aromatic polyester/polycarbonate molding composition by the incorporation of a certain graft copolymer of a butadiene polymer-vinyl monomer therewith.

Core shell polymeric compounds having a butadiene-based core are taught in U.S. Pat. No. 4,180,494 to improve the impact performance of compositions comprising an aromatic polyester and an aromatic polycarbonate. Also of relevance is U.S. Pat. No. 3,769,260 wherein disclosed are thermoplastic molding compositions containing linear saturated polyesters and certain α-olefin polymers.

DETAILED DESCRIPTION OF THE INVENTION

Thermoplastic Polyester

Thermoplastic polyester resins in the present context are polymers or copolymers prepared by condensing primarily aromatic dicarboxylic acids (or an ester forming compound thereof) with a glycol (or an ester forming compound thereof). Among the dicarboxylic acids which are suitable for preparing polyesters in accordance with the present invention are the aromatic dicarboxylic acids including for instance terephthalic acid, isophthalic acid, orthophthalic acid, 2,6-naphthalene dicarboxylic acid, 1,5-naphthalene dicarboxylic acid, as well as aliphatic dicarboxylic acids including for example adipic acid, sebacic acid, azelaic acid, cycloaliphatic dicarboxylic acids such as 1,3-cyclohexane dicarboxylic acid, 1,4-cyclohexane dicarboxylic acid and the like, or ester forming compounds thereof.

The glycols suitable for preparing the polyesters of the invention include for example aliphatic diols having 2 to 10 carbon atoms such as ethylene glycol, 1,3-propylene glycol, 1,4-butanediol, neopentyl glycol, 1,5-pentanediol, 1,6-hexanediol, decamethylene glycol, cyclohexanediol as well as long-chain glycols (MW up to about 6000) such as poly(tetramethylene glycol) and mixtures thereof.

The preferred polyester is polyethylene terephthalate. The dicarboxylic acid component of the polyethylene terephthalate consists mainly of terephthalic acid and may contain up to 10 mol %, based on the total mols of acid of other aromatic dicarboxylic acids having from 6 to 14 carbon atoms, of aliphatic dicarboxylic acids having from 4 to 8 carbon atoms or of cycloaliphatic dicarboxylic acids having from 8 to 12 carbon atoms. Examples of such dicarboxylic acids which may be included with terephthalic acid are phthalic acid, isophthalic acid, naphthalene-2,6-dicarboxylic acid, diphenyl-4,4'-dicarboxylic acid, adipic acid, sebacic acid and cyclohexanediacetic acid.

The diol component of the polyethylene terephthalate consists mainly of ethylene glycol. It may, however, contain up to 10 mol % of aliphatic diols having from 3 to 12 carbon atoms, cycloaliphatic diols having from 6 to 15 carbon atoms or aromatic diols having from 6 to 21 carbon atoms. Examples of such additional diols ("codiols") include propane-1,3-diol, butane-1,4-diol, pentane-1,5-diol, hexane-1,6-diol or cyclohexane-1,4-dimethanol, 3-methyl-pentanediol-(2,4), 2-methylpentanediol-(1,4), 2,2,4-trimethylpentanediol-(1,3), 2-ethylhexanediol-(1,3), 2,2-diethylpropanediol-(1,3), hexanediol-(1,3), 1,4-di(β-hydroxyethoxy)benzene, 2,2-bis-(4-hydroxycyclohexyl)-propane, 2,4-dihydroxy-1,1,3,5-tetramethyl-cyclobutane, 2,2-bis-(3-β-hydroxyethoxyphenyl)-propane and 2,2-bis-(4-hydroxypropoxyphenyl)-propane.

The polyethylene terephthalates can be branched by incorporating relatively small amounts of trihydric or tetrahydric alcohols or tribasic or tetrabasic acids, as described in German Offenlegungsschrift No. 1,900,270 and in U.S. Pat. No. 3,692,744. Examples of suitable branching agents include trimesic acid, pyromellitic acid, trimethylolpropane and ethane, and pentaerythritol. It is advisable not to use more than 1 mol % of branching agent, based on the quantity of acid component.

Polyethylene terephthalates derived from terephthalic acid and ethylene glycol are preferred and homopolyethylene terephthalate, i.e. a product produced substantially only from ethylene glycol and terephthalic acid or its esters, or its anhydride is most preferred.

The polyester resins of the compositions in accordance with the invention are characterized in that their intrinsic viscosity (I.V.) is at least about 0.4 and preferably about 0.6 to about 1.6 dl/gm measured as a 1% solution in a 60:40 mixture of phenol and tetrachloroethane at 30° C. These resins are available commercially or can be prepared by known means such as by the alcoholysis of esters of terephthalic acid with ethylene glycol followed by polymerization, by heating the glycols with the free acids or with their halide derivative and similar processes such as are described among others in U.S. Pat. No. 2,465,319 and 3,047,539, both incorporated herein by reference.

The preferred thermoplastic polyester in the present context is polyethylene terephthalate, PET, such as is available under the designation VFR 5041 from Goodyear Corporation.

Impact Modifier

In the context of the invention, an impact modifier is a rubbery compound characterized in that the glass transition temperature of its elastomeric phase is below 20° C. and further, in its compatibility with the thermoplastic polyester wherein it is incorporated. In the present context it is required that the elastomeric phase is capable of being substantially evenly dispersed throughout the thermoplastic polyester resin, which capability is referred to here as compatibility. The term rubbery compounds in the present context is understood to include natural rubbers and synthetic rubbers. Suitable synthetic rubbers include polyurethane rubber, ethylene/vinyl acetate rubber, silicone rubber and polyether rubber, acrylate rubber, polypentenamer rubber and ethylene-propylene-diene rubbers as well as diene rubbers, i.e. homopolymers of conjugated dienes having 4 to 8 carbon atoms such as butadiene, isoprene, piperylene and chloroprene, copolymers of such dienes including copolymers of such dienes with styrene, acrylic or methacrylic acids or derivatives thereof (e.g. acrylonitrile, methacrylonitrile, acrylic acid, methacrylic acid, butyl acrylate and methyl methacrylate) or isobutylene. Butadiene, butadiene/styrene, butadiene/methyl methacrylate, butadiene/butyl acrylate, ethylene/propylene/diene, polypentenamer, butadiene/acrylonitrile and acrylate rubbers are particularly preferred. In a particularly preferred embodiment, the rubbery phase is at least partially crosslinked.

The rubbery compounds of the invention are preferably graft copolymers obtained by the polymerizing certain monomers in the presence of the rubber. The certain monomers are:

(1) styrene and its derivatives such as α-methylstyrene, α-chlorostyrene, p-chlorostyrene, 2,4-dichlorostyrene, p-methylstyrene, 3,4-dimethylstyrene, o- and p-divinyl benzene, p-methyl-α-methylstyrene and p-chloro-α-methylstyrene;

(2) acrylic and methacrylic acids as well as nitriles and esters based thereon, perferably alkyl esters such as acrylic and methacrylic acid, acrylonitrile, methacrylonitrile, methyl acrylate, ethyl acrylate, n-propyl and isopropyl acrylate, n-butyl and isobutyl acrylate, 2-ethylhexyl acrylate, methyl methacrylate, ethyl methacrylate, n-propyl and isopropyl methacrylate, n-butyl and isobutyl methacrylate, cyclohexyl methacrylate and isobornyl methacrylate;

(3) maleic acid anhydride;

The graft copolymers may be obtained by polymerizing monomers from group (1) or group (2) or both groups (1) and (2) in the presence of the rubbers as mentioned above, optionally also with (3).

Particularly preferred groups of such graft polymers are obtained by polymerizing (a) styrene, -methyl styrene or mixtures thereof, (b) 0–50% by weight (based on total monomers) of the above-mentioned styrene derivatives in the presence of butadiene, butadiene/styrene, butadiene/methyl methacrylate, butadiene/butyl acrylate, ethylene/propylene/diene, polypentenamer or butadiene/acrylonitrile rubbers (which may also contain in copolymerized form small amounts of other monomers). Other particularly preferred graft copolymers are obtained by polymerizing 30–95% by weight of styrene and/or one of the above-mentioned styrene derivatives and 5–70% by weight of the above-mentioned acrylic and/or methacrylic compounds, (1% by weight based on the sum of monomers) in the presence of the above-mentioned rubbers.

Among the particularly preferred graft polymers, those which are obtained by polymerizing styrene or by polymerizing 20–95% by weight of styrene and 5–80% by weight of -methyl styrene (% by weight based on the sum on monomers) or 30–95% by weight of styrene and/or α-methyl styrene and 5–70% by weight of acrylonitrile and/or methacrylonitrile and/or methyl methacrylate (% by weight based on the sum of monomers) in the presence of the above-mentioned rubbers are particularly important.

A yet additional preferred embodiment is represented by the use of a grafted polyacrylate rubber which can be made following known procedures and which is available from a number of sources, e.g. Rohm & Haas Company, Philadelphia, U.S.A. under the trade designations Acryloid KM330 and 7709XP. Other useful polyacrylates are available from Goodyear Tire & Rubber Company, Akron, Ohio, U.S.A. under the trade designation RXL6886; from American Cyanamid Company, Stamford, Conn., U.S.A., under the trade designation Cyanacryl 770; from M & T Chemicals Company, Trenton, N.J., U.S.A., under the trade designation Durastrength 200; and from Polysar Corporation, Canada, under the trade designation Polystar S1006. In general, any of the polyalkyl acrylates described in U.S. Pat. No. 3,591,659, incorporated by reference herein, can be used, especially those containing units derived from n-butyl acrylate. Preferably, the polyacrylate resin will be in the form of a rubber-elastic graft copolymer having a glass transition temperature below 20° C. as described in Schlichting et al, U.S. Pat. No. 4,022,748, incorporated by reference herein. Most preferably, the polyacrylate will comprise a multiple stage polymer having a rubbery first stage and thermoplastic hard final stage, as described in U.S. Pat. Nos. 4,096,202 and 3,808,180, both incorporated herein by reference. Briefly, the technology described in 4,096,202 is that of the preparation of a specific class of multiphase compounds. These are compositions comprising about 25 to 95% by weight of a first elastomeric phase and about 75–5% by weight of a second, rigid, thermoplastic phase. The first phase is polymerized from about 75 to 99.8% by weight $C_1$ to $C_6$ acrylate resulting in an acrylic rubber core having a glass transition temperature below about 10° C. which is crosslinked with 0.1 to 5% by weight of a crosslinking monomer and to which is added 0.1 to 5% by weight of a graft-linking monomer.

The preferred alkyl acrylate is butyl acrylate. The crosslinking monomer is a polyethylenically unsaturated monomer having a plurality of addition polymerizable reactive groups all of which polymerize at substantially the same rate of reaction. Suitable crosslinking monomers include polyacrylic and polymethacrylic esters of polyols such as butylene diacrylate and dimethacrylate, trimethylol propane trimethacrylate and the like; di- and trivinyl benzene, vinyl acrylate and methacrylate, and the like. The preferred crosslinking monomer is butylene diacrylate. The graft-linking monomer is a polyethylenically unsaturated monomer having a plurality of addition polymerizable reactive groups, at least one of which polymerizing at a substantially different rate of polymerization from at least one other of said reactive groups. The function of the graft-linking monomer is to provide a residual level of unsaturation in the elastomeric phase, particularly in the latter stages of polymerization and consequently at or near the surface of the elastomer particles. The preferred graft-linking monomer is allyl methacrylate or diallyl maleate.

The final stage monomer system comprises at least one of alkyl methacrylate (preferably $C_1$–$C_{16}$ methacrylate), styrene, acrylonitrile, alkyl acrylates, dialkyl methacrylate, and the like, and is characterized in that the glass transition temperature of its polymerized form is at least 20° C. Preferably, the final stage monomer system is at least 50 weight % $C_1$ to $C_4$ alkyl methacrylate. It is further preferred that the final stage polymer be free of units which tend to degrade poly(alkylene terephthalate); for example, acid, hydroxyl amino and amide groups.

A certain such acrylic rubber interpolymer composite characterized in that acrylic rubber core is comprised of n-butyl acrylate and in that its crosslinking agent is 1,3-butylene diarylate and in which the graftlinking agent is diallyl maleate and the second phase monomeric system of which is methyl methacrylate, said components relating by weight to 79.2/0.4/20.0, is available in commerce as Acryloid KM330.

Blocked (Capped) Polyisocyanate Prepolymers

Polyisocyanate prepolymers suitable in their end capped configuration as a synergist in the present invention are generally described in U.S. Pat. No. 4,292,226, incorporated herein by reference.

Accordingly, suitable starting materials for producing the NCO-prepolymers are:

1. Any organic polyisocyanates, preferably diisocyanates, corresponding to the formula

$$Q(NCO)_n$$

in which n=2 to 4, preferably 2, and

Q represents a saturated aliphatic hydrocarbon radical containing from 2 to 18, preferably from 6 to 10 carbon atoms, a saturated cycloaliphatic hydrocarbon radical containing from 4 to 15, preferably from 6 to 10 carbon atoms, an aromatic hydrocarbon radical containing from 6 to 15, preferably from 6 to 13 carbon atoms or an arylaliphatic hydrocarbon radical containing from 8 to 15, preferably from 8 to 13 carbon atoms, at least 2 carbon atoms being arranged between the NCO-groups in each case.

Examples of suitable polyisocyanates, particularly diisocyanates, are tetramethylene diisocyanate, hexamethylene diisocyanate, dodecamethylene diisocyanate, cyclobutane-1,3-diisocyanate, cyclohexane-1,3- and -1,4-diisocyanate and mixtures of these isomers, 1-isocyanato-3,3,5-trimethyl-5-isocyanatomethyl cyclohexane (IPDI), 2,4- and 2,6-hexahydrotoluene diisocyanate and mixtures of these isomers, hexahydro-1,3- and/or 1,4-phenylene diisocyanate, perhydro-2,4'- and/or -4,4'-diphenyl methane diisocyanate, 1,3- and 1,4-bis-(isocyanatomethyl)cyclohexane and 1,3- and 1,4-bis(2-isocyanato-2-propyl)benzene, 1,3- and 1,4-phenylene diisocyanate, 2,4- and 2,6-toluene diisocyanate and mixtures of these isomers, diphenyl methane-2,4'- and/or -4,4'-diisocyanate and naphthlene-1,5-diisocyanate. It is of course also possible to use mixtures of these isocyanates. Small quantities of mono- and triisocyanates may also be used. It is also possible to use the modified polyisocyanates known per se in polyurethane chemistry, i.e. polyisocyanates containing for example carbodiimide groups, allophanate groups, isocyanurate groups, urethane groups and/or biuret groups, in the process according to the invention, although this is not preferred.

Preferred polyisocyanate are hexamethylene diisocyanate, 1-isocyanato-3,3,5-trimethyl-5-isocyanatomethyl cyclohexane, diphenyl methane-4,4'-diisocyanate, dicyclohexyl methane-4,4'-diisocyanate, 2,4- and 2,6-toluene diisocyanate and mixtures thereof.

2. Any organic compounds containing at least two isocyanate-reactive groups, more particularly organic compounds containing a total of two amino groups, thiol groups, carboxyl groups and/or hydroxyl groups and having molecular weights (weight average) in the range from about 61 to 10,000 and preferably in the range from about 300 to 4000 with the proviso that the backbone of the resulting prepolymer is substantially immiscible in the thermoplastic polyester matrix. The corresponding dihydroxyl compounds are preferably used. The use of compounds with a functionality of three or higher in the isocyanate polyaddition reaction in small quantities in order to obtain a certain degree of branching is also possible, as is the above-mentioned possible use of trifunctional or more highly functional polyisocyanates for the same purpose.

Preferred hydroxyl compounds are the hydroxy polyethers, hydroxy polythioethers, hydroxy polyacetals, hydroxy polyolefins, hydroxy polybutadiene, hydroxy polycarbonates and/or hydroxy polyester amides known per se in polyurethane chemistry.

The polyethers suitable for use in accordance with the invention, preferably containing two hydroxyl groups are also known per se and are obtained for example by polymerizing epoxides, such as ethylene oxide, propylene oxide, butylene oxide, tetrahydrofuran, styrene oxide or epichlorohydrin, on their own, for example in the presence of boron trifluoride, or by the addition of these epoxides, either in admixture or successively, with starting components containing reactive hydrogen atoms, such as alcohols and amines, for example water, ethylene glycol, 1,3- or 1,2-propylene glycol, 4,4'-dihydroxy diphenyl propane or aniline.

Polyethers modified by vinyl polymers of the type formed for example by polymerizing styrene, acrylonitrile in the presence of polyethers as described in U.S. Pat. Nos. 3,383,511; 3,304,273; 3,523,093; and 3,110,695, all incorporated herein by reference and German Patent No. 1,151,536 are also suitable. The more highly functional polyethers which may also be proportionately used are similarly obtained in known manner by alkoxylating starter molecules of relatively high functionality, for example, ammonia, ethanolamine, ethylene diamine or sucrose.

Among the polythioethers, particular reference is made to the condensation products of the thiodiglycol on its own and/or with other glycols, dicarboxylic acids, formaldehyde, aminocarboxylic acids or aminoalcohols. Depending on the co-components, the products in question are polythio mixed ethers, polythio ether esters, polythio ether ester amides.

Suitable polyacetals are, for example, the compounds obtainable from glycols, such as diethylene glycol, triethylene glycol, 4,4'-diethoxy diphenyl dimethyl methane, hexane diol and formaldehyde. Polyacetals suitable for use in accordance with the invention may also be obtained by polymerizing cyclic acetals.

Suitable polycarbonates containing hydroxyl groups are known per se and may be obtained for example by reacting diols, such as 1,3-propane diol, 1,4-butane diol and/or 1,6-hexane diol, diethylene glycol, triethylene glycol, tetraethylene diol, with diaryl carbonates, for example diphenyl carbonate, or phosgene.

The polyester amides and polyamides include for example the predominantly linear condensates obtained from polybasic saturated and unsaturated carboxylic acids or their anhydrides and polyhydric saturated and unsaturated amino alcohols, diamines, polyamines and their mixtures. Polyhydroxyl compounds already containing urethane or urea groups may also be used.

It is also possible to use low molecular weight polyols such as, for example, ethane diol, 1,2- and 1,3-propane diol, 1,4- and 1,3-butane diol, pentane diols, hexane diols, trimethylol propane, hexane triols, glycerol and pentaerythritol. Monofunctional alcohols, such as stearyl alcohol for example, may also be used in small quantities.

Representatives of the above-mentioned polyisocyanate and hydroxyl compounds suitable for use in the process according to the invention are described, for example, in High Polymers, Vol. XVI, "Polyurethanes, Chemistry and Technology" by Saunders-Frisch, Interscience Publishers, New York, London, Volume I, 1962, pages 32 to 42 and pages 44 to 54, and Volume II, 1964, pages 5 to 6 and 198 to 199, and also in Kunststoff-Handbuch, Volume VII, Vieweg-Höchtlen. Carl-Verlag, Munich, 1966, for example on pages 45 to 71.

Further, U.S. Pat. Nos. 3,756,992 and 3,479,310 both incorporated herein by reference provide added information respecting the preparation of suitable polyurethane prepolymers which upon capping are useful in the present context.

Capped, or blocked, isocyanates are described, for instance in Polyurethanes, Chemistry and Technology by Saunders and Frisch, 1962, incorporated by reference herein—see especially pages 118–121 and in New Developments in the Field of Blocked Isocyanates II by Zeno W. Wicks, Jr., Polymers and Coatings Department, North Dakota State University, Fargo, North Dakota, Prog. Org. Coat., 1981 9(1) 3–28, incorporated herein by reference.

Blocking agents suitable for use in the process according to the invention are, in particular, compounds which preferably one isocyanate-reactive group which enter into an addition reaction with organic isocyanates at temperatures above about 50° C. and preferably at temperatures in the range of from about 60° to 100° C., and whose resulting addition products, in admixture with involatile polyols containing primary hydroxyl groups, react with the involatile polyols to form urethanes at temperatures in the range of from about 100° to 200° C., the reaction being accompanied by liberation of the blocking agent. Suitable blocking agents of this type are, for example, secondary or tertiary alcohols, such as isopropanol or tert.-butanol, C-H-acid compounds, such as malonic acid dialkyl esters, acetyl acetone, acetoacetic acid alkyl esters, oximes, such as formaldoxime, acetaldoxime, methyl ethyl ketone oxime, cyclohexanon oxime, acetophenone oxime, benzophenone oxime or diethyl glyoxime, lactams, such as ε-captolactam, δ-valerolactam, γ-butyrolactam, phenols, such as phenol, o-methyl phenol, N-alkyl amides, such as N-methyl acetamide, imides, such as phthalimide, imidazole, alkali metal bisulphites and trialkyl ammonium bisulphites.

The preferred blocking (or capping) agents are cyclic 1,3-diketone, for example 1,3-cyclohexanedione, hydroxamic acid ester, benzotriazole, imidazole oxime, for example 2-butanone oxime, alcohol, phenol, hydroxy substituted nitrogen compounds such as n-hydroxy phthalimide.

A particularly preferred blocked (capped) prepolymer is an ε-caprolactam capped TDI-polyurethane prepolymer.

In preparing the composition of the invention, a blend is prepared containing about 0.5 to about 8 preferably 1.0–5.0 phr (parts per hundred weight of resins) of the end blocked (capped) polyisocyanate prepolymer, the phr values being related to the weight of the resin mixture, i.e. thermoplastic polyester and impact modifier, The resin mixture comprises about 5 to about 30 percent preferably 10 to 25 percent of the impact modifier and about 70 to about 95 percent preferably 75 to 90 percent of thermoplastic polyester.

The thermoplastic resin composition of this invention may be prepared by uniformly mixing the components, using any desired means such as a Banbury mixer, a hot roll or an extruder. The mixture is extruded and pelletized in a known manner, and is suitable for injection molding into a variety of useful articles. The composition may contain additives such as are well known in the art including stabilizers, mold release agents, crystallization promoters, dyes and pigments, flame retardants as well as fillers and reinforcing agents, such as glass fibers at an amount of about 10 to 40 percent relative to the weight of the molding composition.

The invention is further illustrated, but is not intended to be limited by the following examples in which all parts and percentages are by weight unless otherwise specified.

EXAMPLES

Example 1

The preparation of an ε-caprolactam capped TDI-polyisocyanate prepolymer suitable in the present context was carried out as follows:

The polyol components (302 parts by weight of polyol A which is a 2000 MW difunctional polypropylene oxide, 157 parts by weight of polyol B which is a 3000 MW-glycerin initiated trifunctional polypropylene oxide and 232.3 parts of weight of a 4800 MW polyol C which is a glycerin initiated polyether containing both propylene oxide and ethylene oxide) and 1.66 parts by weight of trimethylol propane and 106.8 parts of TDI (a mixture of 80% of 2,4-isomer and 20% of the 2,6-isomer) were mixed and heated with continued stirring to 70°–75° C. The mixture was allowed to react until the NCO content was just below the theoretical level (3.0%) which reaction took about 7 hours. 81.4 parts by weight of ε-caprolactam were then charged and the mixture was heated with stirring to 80°–85° C. and allowed to react until no free isocyanate was detected by infrared spectroscopy, which reaction time was about 8 hours. The product was characterized in that its blocked NCO content was 2.6% and its viscosity, at 25° C. was 55,000 mPa-s.

Example 2

Compositions in accordance with the present invention were prepared and their properties determined. The preparation procedure entailed first drying the powdery components overnight at 185° F., followed by blending (Welex at 1800 rpm for 4 minutes) and extrusion (1½" Hartig, 2.75:1 compression ratio, screw speed 80 rpm, screen pack 20-40-60, at temperature profile of (°C.):

| | | |
|---|---|---|
| | rear | 271 |
| | middle | 271 |
| | front | 271 |
| | die | 238. |

Injection molding was carried out (Newbury, 4 oz.) under the condition below:

| | | |
|---|---|---|
| zone set temperature | rear | 260° C. |
| | front | 260° C. |
| | nozzle | 254° C. |
| | mold | 90° C. |
| cycle time (seconds) | injection | 10 |
| | cooling | 25 |
| | total | 35 |
| injection pressure | | 1100 psi. |

The table below is a summary of the results obtained upon the testing of compositions in accordance with the invention. Based on poly(ethylene terephthalate) resin (IV=1.04) all the compositions contained about 3.3 percent of talc as an nucleating agent and about 0.8 percent of octadecyl-3-(3',5'-di-tert.-butyl-4-hydroxyphenyl)propionate as an antioxidant; the composition numbered 3 contained also about 0.8 percent of tris-[(3-ethyl-oxetanyl-3)methyl]-phosphite, a thermal stabilizer; the percentages are in relation to the weight of PET. Neither the antioxidant nor the thermal stabilizer is believed critical to the invention. Talc is not a necessary component in the composition of the invention as any of the agents known in the art to cause nucleation in the polyester component are suitable.

| Composition | 1 | 2 | 3 | 4 |
|---|---|---|---|---|
| PET[(1)], % | 75.0 | 75.0 | 75.0 | 75.0 |
| Impact modifier, % | | | | |
| A[(2)] | 25.0 | 25.0 | — | — |
| B[(2)] | — | — | 25.0 | 25.0 |
| Blocked Polyisocyanate Prepolymer, phr[(3)] | 0 | 5 | 0 | 5 |
| Flexural strength, psi × 10³ | 8.9 | 8.0 | 9.0 | 7.0 |
| Flexural modulus, psi × 10⁵ | 2.53 | 2.66 | 2.79 | 2.42 |
| Heat Deflection Temperature, °C. at 264 psi | 76 | 73 | 73 | 75 |
| Impact Strength, Notched Izod (⅛") ft. lb/in. | | | | |
| as molded | 3.2 | 18.5 | 3.6 | >16.1 |
| after heating[(4)] | 2.7 | >11.7 | 2.5 | 13.8 |

[(1)]Goodyear's VFR 5041 (IV = 1.04)
[(2)]A = Acryloid KM330 (a core/shell structure based on butyl acrylate rubbery phase grafted with methyl methylacrylate); B = SAN grafted onto acrylic rubber characterized in that it contains 80% polybutyl acrylate (Tg < 30° C.) and in that the weight ratio of S/AN is 72/28.
[(3)]ε-caprolactam capped TDI-polyisocyanate prepolymer; added at the indicated level; phr means parts per hundred weight of resin (PET plus impact modifier).
[(4)]heating at 130° C. for 30 minutes.

Example 3

Compositions in accordance with the invention were prepared demonstrating the applicability of the concept in glass fibers reinforced systems. The preparation of the molding compositions entailed blending of the components and extrusion (2" vented extruder; temperature profile-rear to front; °C.-280, 280, 270, 260, 250, 270, 270, compression ratio 2.75:1, screw speed 90 rpm). Injection molding of the samples was carried out using a Newbury 4 oz. machine, at the following molding conditions:

| | | |
|---|---|---|
| zone set temperature | rear | 260° C. |
| | front | 260° C. |
| | nozzle | 254° C. |
| | mold | 131° C. |
| cycle time | | 25 seconds |

The compositions were based on poly(ethyleneterephthalate) having an inherent viscosity of 0.6 as measured as a 0.5% solution in a 60% phenol/40% tetrachloroethane solvent at 25° C. (Tenite 7741 from Kodak) and all contained 0.2 percent of talc, 0.5 percent of an epoxide (Epon 1031 from Shell Chemical Corp.), 0.2 percent of an antioxidant (octadecyl-3-(3',5'-di-tert.-butyl-4-hydroxyphenyl)propionate), 0.1 percent of a thermal stabilizer (tris-[(3-ethyloxetanyl-3)methyl]-phosphite and 0.1 percent of a hydrolysis stabilizer conforming structurally to

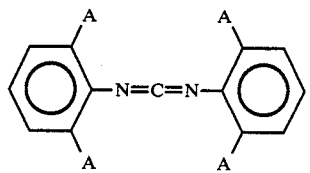

where A is

Further, all the compositions contained 30 percent of glass fibers (PPG 3540, 10 microns in diameter). The blocked polyisocyanate prepolymer used in these examples is ε-caprolactam capped TDI-polyisocyanate prepolymer of Example 1 above and the impact modifiers were: A=Acryloid KM330 and C=a polybutadiene 75%, grafted with SAN, 25%, S/AN weight ratio 72/28.

The table below describes the compositions in terms of their components (the percents are by weight) and their respective impact strength:

| | Control 1 | Control 2 | 1 | 2 |
|---|---|---|---|---|
| PET | 64.9 | 64.9 | 60.4 | 60.4 |
| glass fibers | 30.0 | 30.0 | 30.0 | 30.0 |
| Thermal Stabilizer | 0.1 | 0.1 | 0.1 | 0.1 |
| Hydrolysis Stabilizer | 0.1 | 0.1 | 0.1 | 0.1 |
| Antioxidant | 0.2 | 0.2 | 0.2 | 0.2 |
| Epoxide | 0.5 | 0.5 | 0.5 | 0.5 |
| Talc | 0.2 | 0.2 | 0.2 | 0.2 |
| Impact Modifier-A | 4.0 | — | 4.0 | — |
| Impact Modifier-C | — | 4.0 | — | 4.0 |
| Blocked Polyisocyanate Prepolymer | — | — | 4.8 | 4.8 |
| ⅛"Izod Impact (J/m) Notched | 114 | 117 | 154 | 158 |

Naturally, modifications and/or variations of the presently disclosed invention are possible in light of the above disclosure. It should however be understood that such are within the scope of the invention as defined by the following claims.

What is claimed is:

1. A thermoplastic molding composition comprising the extruded blend of
   (i) about 70-95 percent of a polyethylene terephthalate resin having an intrinsic viscosity of at least about 0.4 dl/gm measured as a 1% solution in a 60:40 mixture of phenol and tetrachloroethane at 30° C., and
   (ii) about 5-30 percent of an elastomeric impact modifier characterized in its compatibility with said resin and in that the glass transition temperature of its elastomeric phase is below 20° C. said percent being relative to the weight of said blend, and about 0.5 to about 8 phr of a blocked polyisocyanate prepolymer wherein prepolymer is a reaction product of a polyisocyanate and an organic compound which contains at least two isocyanate-reactive groups having weight average molecular weight of 61 to 10,000 selected from the group consisting of hydroxy polyethers, hydroxy polythioethers, hydroxy polyacetals, hydroxy polyolefins, hydroxy polybutadiene, hydroxy polycarbonates and hydroxy polyester amides, said phr being relative to the weight of said blend, said prepolymer being further characterized in that its backbone is substantially immiscible in said resin.

2. The thermoplastic molding composition of claim 1 wherein said isocyanate-reactive group is hydroxy polyether.

3. A thermoplastic molding composition comprising the extruded blend of
   (i) about 70-95 percent of a polyethylene terephthalate resin having an intrinsic viscosity of at least about 0.4 dl/gm measured as a 1% solution in a 60:40 mixture of phenol and tetrachloroethane at 30° C., and
   (ii) about 5-30 percent of an impact modifier characterized in the core/shell structure wherein core comprises $C_1$-$C_6$ acrylate rubber and wherein shell comprises a rigid thermoplastic phase, said percents being relative to the weight of said blend and about 0.5 to about 8 phr of a blocked polyisocyanate prepolymer wherein prepolymer is a reaction product of a polyisocyanate and an organic compound which contains at least two isocyanate-reactive groups having weight average molecular weight of 61 to 10,000 selected from the group consisting of hydroxy polyethers, hydroxy polythioethers, hydroxy polyacetals, hydroxy polyolefins, hydroxy polybutadiene, hydroxy polycarbonates and hydroxy polyester amides, said phr being relative to the weight of said blend, said prepolymer being further characterized in that its backbone is substantially immiscible in said resin.

4. A thermoplastic molding composition comprising the extruded blend of
   (i) about 70-95 percent of a polyethylene terephthalate resin having an intrinsic viscosity of at least about 0.4 dl/gm measured as a 1% solution in a 60:40 mixture of phenol and tetrachloroethane at 30° C., and
   (ii) about 5-30 percent of an impact modifier characterized in its core/shell structure wherein core comprises $C_1$-$C_6$ acrylate rubber and wherein shell comprises a rigid thermoplastic phase, said percents being relative to the weight of said blend and about 0.5 to about 8 phr relative to the weight of said blend, of a blocked polyisocyanate prepolymer which is the polyaddition reaction product of toluene diisocyanate and hydroxy polyether which product is blocked by $\xi$-caprolactam.

5. A thermoplastic molding composition comprising a blend of
   (i) about 70-95 percent of a polyethylene terephthalate resin having an intrinsic viscosity of at least about 0.4 dl/gm measured as a 1% solution in a 60:40 mixture of phenol and tetrachloroethane at 30° C., and
   (ii) about 5-30 percent of an impact modifier characterized in its core/shell structure wherein core comprises $C_1$-$C_6$ acrylate rubber and wherein shell comprises a rigid thermoplastic phase, said percents being relative to the weight of said blend and about 0.5 to about 8 phr relative to the weight of said blend, of a blocked polyisocyanate prepolymer which is the polyaddition reaction product of toluene diisocyanate and hydroxy polyether which product is blocked by $\epsilon$-caprolactam.

6. The molding composition of claim 5 wherein said rigid thermoplastic phase is based on a monomer system comprising at least one member selected from the group consisting of $C_1$-$C_6$ alkyl methacrylate, styrene, acrylonitrile and dialkyl methacrylate.

7. The molding composition of claim 5 wherein said rigid thermoplastic phase is based on $C_1$-$C_4$ alkyl methacrylate.

8. The molding composition of claim 5 further comprising glass fibers.

9. The molding composition of claim 8 wherein said glass is present at an amount of 10 to 40 percent relative to the weight of the composition.

10. A thermoplastic molding composition comprising a blend of
    (i) about 70-95 percent of a polyethylene terephthalate resin having an intrinsic viscosity of at least about 0.4 dl/gm measured as a 1% solution in a 60:40 mixture of phenol and tetrachloroethane at 30° C., and
    (ii) about 5-30 percent of an impact modifier characterized in that it is a graft copolymer wherein rubber elastic phase comprises polybutyl acrylate and wherein grafted phase comprises styrene and acrylonitrile, said percents being relative to the weight of said blend and about 0.5 to about 8 phr relative to the weight of said blend, of a blocked polyisocyanate prepolymer which is the polyaddition reaction product of toluene diisocyanate and hydroxy polyether which product is blocked by $\xi$-caprolactam.

* * * * *